United States Patent [19]
Stimler

[11] 3,863,166
[45] Jan. 28, 1975

[54] LASER IMAGE INTENSIFIER
[75] Inventor: Morton Stimler, Rockville, Md.
[73] Assignee: The United States of America as represented by the Secretary of the Navy, Washington, D.C.
[22] Filed: Feb. 5, 1973
[21] Appl. No.: 329,784

Related U.S. Application Data
[63] Continuation-in-part of Ser. No. 889,445, Dec. 31, 1969, abandoned.

[52] U.S. Cl............. 330/4.3, 331/94.5 A, 332/7.51, 350/160
[51] Int. Cl........................... H01s 3/05, H01j 31/50
[58] Field of Search..................... 331/94.5; 330/4.3; 350/160; 250/213

[56] References Cited
UNITED STATES PATENTS

| | | | |
|---|---|---|---|
| 2,929,922 | 3/1960 | Schawlow et al. | 330/4.3 |
| 3,142,760 | 7/1964 | Iams | 250/213 |
| 3,292,103 | 12/1966 | Soules et al. | 331/94.5 |
| 3,379,998 | 4/1968 | Soules et al. | 331/94.5 |
| 3,452,286 | 6/1969 | Adler | 330/4.3 |
| 3,499,157 | 3/1970 | Satake et al. | 250/213 |
| 3,530,401 | 9/1970 | Garbuny et al. | 331/94.5 |

OTHER PUBLICATIONS
Myers et al., "Wide Field Active Imaging," 8/66, pg. 270-275, IEEE, J.Q.E., Vol. QE-2, No. 8.

*Primary Examiner*—Maynard R. Wilbur
*Assistant Examiner*—N. Moskowitz
*Attorney, Agent, or Firm*—R. S. Sciascia; J. A. Cooke; Sol Sheinbein

[57] ABSTRACT

A true image intensifier which converts a target image at low light level to an intensified image at the output of a laser. A modified conventional electron image intensifier is used as the input to a conjugate resonator laser cavity for spatially modulating one of the cavity reflectors with an image of the target. The modulated reflectivity of the end reflector causes the laser output to be spatially modulated according to the target image. The spatially modulated laser output is then projected onto a screen, providing an intensified image of the target.

8 Claims, 8 Drawing Figures

LASER IMAGE INTENSIFIER

LASER BEAM EXPANDER AND SPATIAL FILTER

LASER IMAGE INTENSIFIER

DEPTH OF ELECTRON PENETRATION VS
DENSITY OF SOLID WITH ELECTRON ENERGY AS PARAMETER.

CONJUGATE RESONATOR CONFIGUATIONS:
(a) COINCIDENT CENTERS OF CURVATURE,
(b) CONJUGATE CONCENTRIC RESONATOR,
(c) FLAT FIELD CONJUGATE RESONATOR.

LASER IMAGE INTENSIFIER

CROSS REFERENCES TO RELATED APPLICATIONS

This application is a continuation-in-part of Ser. No. 889,445, filed Dec. 31, 1969, now abandoned.

BACKGROUND OF THE INVENTION

This invention relates generally to the art of image intensification and in particular to an apparatus for amplifying the intensity of a target image of low light level.

The scientific community has long has interested in developing better devices for amplification of light images for use in a wide variety of applications from night vision, for both military and crime prevention purposes, to amplification of television and other low intensity images.

Existing image intensifiers generally include an optical system that focuses a low intensity target image on a layer of photoemissive material. Electrons released by the photoemissive material in response to the impinging light image are spatially modulated in the form of the low intensity image. These electrons are accelerated through a high potential field, focused by an electron lens, and impinge on a luminescent screen, providing an intensified target image.

Though the operation of such intensifiers is generally satisfactory they have an upper limit of sensitivity, which has already been approached, due to a number of inherent spurious effects resulting from limitations in the very materials of which they are constructed. For example, increases in the sensitivity of such devices by increasing the electron accelerating potential are limited by secondary electron emissions from the luminescent screen material, causing the intensified image to lose its contrast and become blurred. Another limitation is the undersirable image persistence of presently available phosphorous screens, rendering difficult the observation and tracking of moving targets. Thus existing electron image intensifiers possess a variety of defects which limit their utility.

Some work has been done in the past in the field of laser output modulation, but it has been confined primarily to amplitude and frequency modulation of laser beams as methods of communication. Very little work has been done in the area of spatial modulation of laser beams, to produce intensified images of objects. Although experiments have been carried out which demonstrated the laser's ability to undergo point to point laser operation (C. W. A. Hardy, "Active Image Formation in Lasers," IBM Journal, Volume 9, page 31, 1965), such experiments have stopped far short of the development of a true laser image intensifier.

SUMMARY OF THE INVENTION

Accordingly, one object of this invention is to provide a laser image intensifier.

Another object of this invention is to provide an image intensifier of greatly improved sensitivity.

Yet another object of the instant invention is to provide a novel image intensifier having an improved resolution.

Still another object of the present invention is to provide a laser image intensifier having negligible image persistence.

Briefly, these and other objects are achieved by a laser cavity configuration in the form of a conjugate resonator having a material of variable or modulatable reflectivity as one end reflector of the laser cavity whereon an image is produced using a modified version of a conventional electronic image intensifier. The image so produced causes the laser to emit a spatially modulated beam which is projected onto a suitable viewing screen. The thickness of the modulatable reflector is also highly critical for providing proper modulation of the end reflector.

BRIEF DESCRIPTION OF THE DRAWINGS

A more complete appreciation of the invention and many of the attendant advantages thereof will readily appreciated as the same becomes better understood by reference to the following detailed description when considered in connection with the accompanying drawings wherein.

DESCRIPTION OF THE PREFERRED EMBODIMENT

Figure 1:
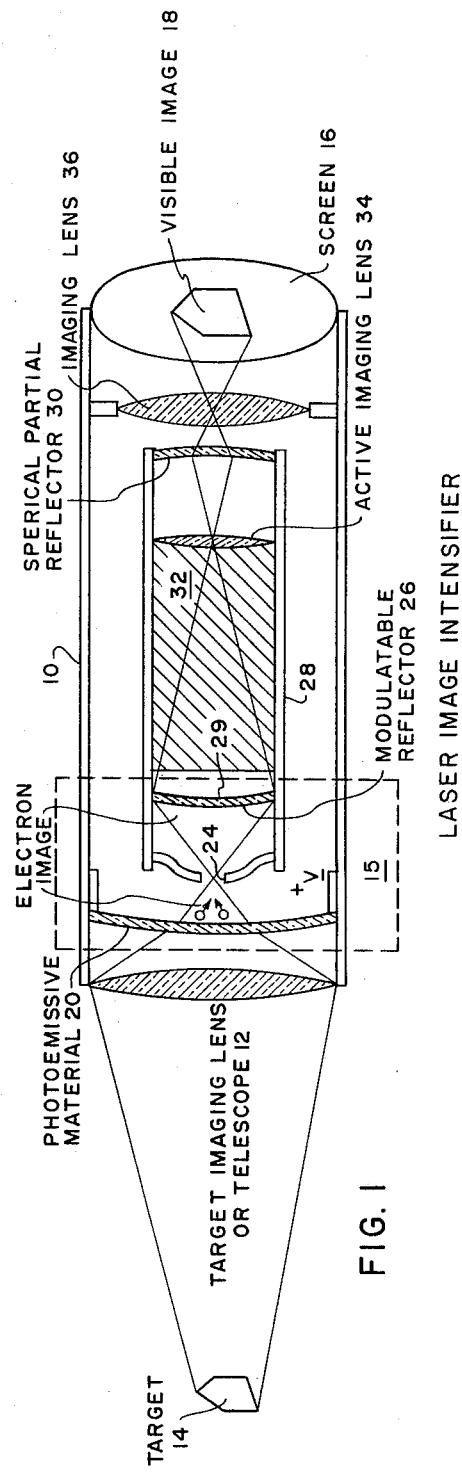
FIG. 1 is a schematic view of the laser image intensifier of the instant invention.

Referring now to the drawings wherein like reference characters designate identical or corresponding parts throughout the several views, and more particularly to FIG. 1 thereof, a cylindrical housing is shown containing all of the components of the laser image intensifier of the instant invention. At one end of housing 10 a target imaging lens 12 is mounted for focusing light radiated from a target 14 onto a modified version of a conventional electron image intensifier system 15. Imaging lens 12 may be replaced by a telescope or other suitable optical system, the only restriction being that it be capable of focusing a light image into the modified electron image intensifier 15. At the other end of housing 10, is mounted an imaging screen 16 on which an intensified image 18 of target 14 is projected.

The optical image of target 14 is focused by lens 12 on a photoemissive screen or element 20 of electron image intensifier 15, which emits electrons from one surface in response to the impingement of light photons on the opposite surface thereof. The electrons so emitted, which have a density corresponding to the intensity of the image projected on the photoemissive element by lens 12, are focused by an electron lens 22, having a focusing aperture 24, on a modulatable reflector 26. The photoemissive element 20 and electron lens 22 may be substantially the same as the equivalent elements of a conventional electron image intensifier. The density distribution of electrons emitted from the surface of the photoemissive element 20 are spatially distributed in accordance with the image projected on the element 20 through imaging lens 12. The electrons forming the electron image are accelerated through a high potential field V toward focusing aperture 24, and are then projected, still with the same spatial distribution onto modulatable reflector 26.

An inner concave surface 29 of modulatable reflector 26 together with a partial reflector 30, also having a concave surface, both preferably spherical, form a conjugate resonator cavity. An active medium 32 such as a mixture of helium and neon (He-Ne) or the like, and an active imaging lens 34 convert this cavity into a conjugate resonator laser.

Modulatable reflector 26, rather than being formed of a phosporous or luminescent material as is used in a conventional electron image intensifier, is comprised of a semiconductor material such as the lead-tin-telluride alloys or any of the dielectric materials used in the manufacture of dielectric film mirrors or any equivalent material exhibiting the characteristic of changing its index of refraction in regions of minority carrier injection thereby changing its reflectance. That is, the reflectance of modulatable reflector 26 varies in accordance with the density of electrons impinging on a particular area of its surface. Thus, since photoemissive element 20 emits greater quantities of electrons in areas where brighter light images are focused upon it, the electrons so emitted are acclerated and focused on modulatable reflector 26 causing it to be more reflective in areas corresponding to brighter target image areas. An image of target 14 is therefore formed on modulated reflector 26 as a varied reflectivity pattern. The pattern so formed retains substantially the same shading and contrast as is seen by imaging lens.

The thickness of modulatable reflector film 26 is critical since by proper selection of this parameter reflectivity changes by a few percent at the surface of the material due to the injection of electron carriers can be amplified by multiple internal reflections to reflectance changes in the order of 90 percent. Thus, the modulatable reflector material is selected to have a thickness approximately equal to the electron penetration depth such that the modulation in reflectance is optimized in the modulated reflector 26. The ideal thickness is determined by the laws of multiple reflections in optics, the density of the material used, and by the amount of energy used to accelerate electrons emitted from photoemissive element 20.

The low light level imaging according to the present invention makes use of the following characteristics of reflecting semiconductor film 26 to provide an intensified target image 14 on screen 16. When carriers such as the electrons from photoemissive material 20 are injected into semiconductor material 26 there is a change in the reflectivity of the material where reflectivity is defined as the ratio of reflected to incident intensity at the surface of a material. Changes in reflectivity may be enhanced by the interference effects of multiple internal reflections within the film properly chosen to provide appreciably greater changes in reflectance, (defined as the ratio of reflected to incident intensity including multiple internal reflections). The change in reflectance increases with increasing numbers of injected carriers. Thus, the image information in the spatial distribution of electron density from the photoemissive material 20 is transferred to the semiconductor reflector 26 in the form of a corresponding spatial distribution of reflectance. This reflectance distribution causes a corresponding spatial modulation of all of the point-to-point laser modes in the conjugate resonator resulting in a corresponding distribution in the output light intensity of the laser to produce the intensified target image on screen 16 by action of lens 34. The semiconductor thickness is preselected to give minimum reflectance of radiation by interference at a specific wavelength. The advantage of using interference effects in this way is the gain of a substantial amplification factor over and above the change in reflectivity of the semiconductor. The modulation is the result of changes in optical path length due to changes in index of refraction under free carrier injection. The free carriers are electrons which comprise an electron image and produce spatial modulation of the reflectance. This in turn controls the spatial intensity distribution of the laser to produce a corresponding image in its output.

More particularly, the semiconductor thickness d is so chosen so that the reflectance of the semiconductor ranges from a minima to a maxima to light from active medium 32 incident on the semiconductor. Thus, the semiconductor thickness d must be chosen to provide a change in reflectance from a minima to a maxima for radiation from active medium 32 of the laser.

Figure 3:
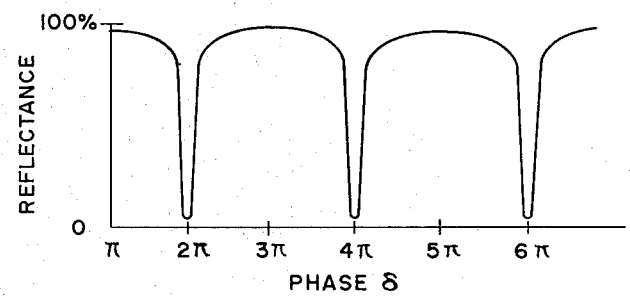
FIG. 3 is a graph illustrating reflectance calculated as a function of phase shift between radiation reflected from the front and back surfaces of a reflecting film.

When incident radiation of wavelength $\lambda$, wherein $\lambda$ is the wavelength of active medium 32 strikes semiconductor 26, there is a phase change of $\pi$ radians on reflections from the first surface and an additional phase change due to the additional optical path length travelled by that radiation which is reflected from the second surface. The additional optical path length, $q$, is given by the relation:

$$q = 2nd \qquad (1)$$

wherein $n$ is the index of refraction of the semiconductor and $d$ is the semiconductor thickness, with the incident radiation normal to the semiconductor surface. The phase change $\delta$, in radians, due to the added path length $q$ is illustrated in FIG. 3 as a function of reflectance. As indicated therein, minimum reflectance occurs at phase changes of $$\delta = 2p\pi \quad \text{(minima)} \qquad p = \text{integer} \qquad (2)$$

while maximum reflectance is given by the relation:

$$\delta = (2p + 1)\pi \quad \text{(maxima)}, \qquad p = \text{integer} \qquad (3)$$

Relatively small index of refraction changes which produce small changes in $\delta$ and small changes in reflectively, nonetheless, produce relatively large changes in reflectance of certain semiconductor materials.

The added path length requirement for minimum reflectance at incident radiation $\lambda$ is given by the relation $$q = p\lambda \quad \text{(minima)} \qquad p = \text{integer} \qquad (4)$$

From equation (1) and (4), the allowed semiconductor thicknesses that will yield minimum reflectance is given by $$d = p \lambda/2n \quad \text{(minima)} \tag{5}$$

Figure 2:
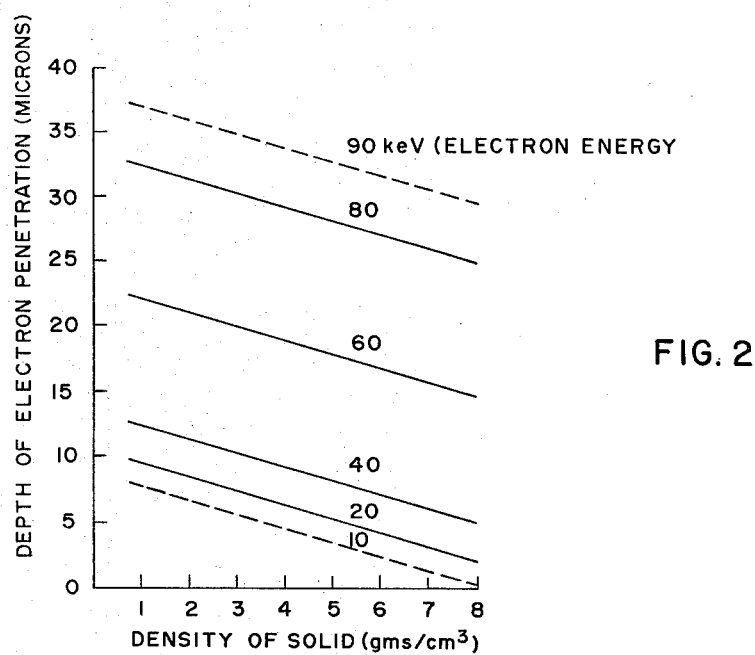
FIG. 2 is a graph illustrating electron penetration depth as a function of density with electron energy as a parameter.

The thickness for $d$ is therefore not exclusive, and it is important that the parameter d is optimized. This is accomplished in the following manner:

The change in optical path length between maximum and minimum reflectance is given by the relation $$q \max - q \min = 2t \Delta n$$

wherein $t$ is the electron penetration depth, $\Delta n$ is the change in index of refraction. FIG. 2 illustrates a family of curves which shows electron penetration depth, $t$, as a function of density of the semiconductor with electron energy as a parameter. In general, the electron energy and the density of semiconductor 26 will be known. To find the optimum thickness $d$ an iterative procedure is used. The electron penetration depth is determined from FIG. 2 and substituted for $d$ in equation (5) which is then used to solve for $p$, which in general is found not to be an integer. Since $p$ must be an integer in accordance with equations (1) – (5), the next larger integral value of $p$ is chosen. This value of $p$ is then used to solve for that vlaue of $d$ which will be the optimum thickness that provides an optimum change in reflectance from a minima to a maxima, to incident radiation of wavelength $\lambda$.

Figure 4:
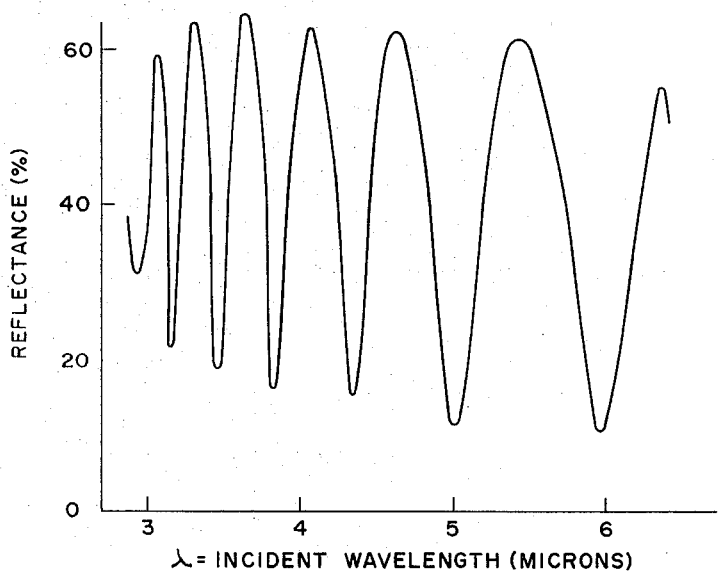
FIG. 4 is an experimental plot of reflectance as a function of incident wavelength for a reflecting film.

To illustrate this procedure for typical material, the calculations for a lead salt semiconductor, PbS, follows. Referring to FIG. 4 of the drawings, a spectrometer plot of reflectance versus wavelength for a PbS film is shown. As shown therein, changes in reflectance of over 50 percent may be obtained for wavelengths of about 3 to 6.5 microns. Considering an appropriate wavelength within this range of $\lambda = 3.39$ $\mu$ perpendicular to semiconductor 26, the density of PbS is 7.6 gm/cm$^3$ and the index of refraction for radiation of 3 $\mu$ is $n = 4.10$. Assuming an electron energy of 20 keV, from potential field $V$ of FIG. 1, the electron penetration is found from FIG. 2 to be $3.7\mu$. Substituting the electron penetration depth for $d$ in equation (5), solving for $p$, and assigning $p$ the next larger integral value yields.

$$p = 2nd \rightarrow 9$$

Substituting $p = 9$ into equation (5) and solving for $d$, which had heretofore been estimated by electron penetration, shows that the optimum thickness of semiconductor 25 is $d = 3.72\mu$. This value of semiconductor thickness satisfied the minimum reflectance requirement with a phase change of $\delta = 18 \pi$. Additionally, since the thickness of the semiconductor is approximately equal to the electron penetration depth, the most efficient use of the injected carriers is made. Table I illustrates thicknesses for various semiconductor materials calculated as hereinabove.

tics should be understood. It should be noted that the structure of this conjugate resonator laser shown in FIG. 1 must be such that the radius of curvature of both reflectors, that is, for example 29 and 30, must be equal to the distance of each of the respective reflectors from the imaging lens 34. Given this structure, each point on one reflector has a conjugate image point on the other. This, with an active medium 32 mounted within the conjugate resonant cavity, point to point lasing action is possible. This means, for example, that if the entire reflecting area of inner surface 29 were shielded except of a small region approaching a single reflective point, then lasing action would take place only between that point and its conjugate image point in laser 32. The amplified light resulting from this laser action would then appear as a single bright spot when imaged on screen 16 by imaging lens 36. The intensity of the spot on screen 16 depends on the reflectance of the unshielded point on the modulate reflector 26 with greater reflectance producing greater intensity. The composite of all such spots on screen 16 serves to produce the desired image in its shades of gray.

In operation, modulatable reflector 26 normally has a sufficiently low reflectivity to prevent triggering active medium 32. However, the focusing of an image by lens 12 on photoemissive element 20 results in a minority carrier injection into modulatable reflector 26, increasing the reflectivity of surface 29 in proportion to the intensity of the electron image impinging thereon. Thus, lasing action is created on a point to point basis, depending upon the degree of reflectivity produced on surface 29. It will be understood, for example, that a bright portion of a target produces a high reflectivity on surface 29, creating a relatively intense laser image on reflector 30, while a dim portion of a target creates a relatively low reflectivity on surface 29, producing a low intensity image on partial reflector 30. Thus, the system preserves the shape and shading of the target while producing an intensified image of it with improved contrast, and, therefore, with improved clarity. Operating in this manner, the laser image intensifier of the instant invention is a true active image amplifier in which an image at low light intensity is amplified by lasing action to produce an intensified image at the laser output.

A portion of the intensified image produced by laser 32 is transmitted through partial reflector 30 and through an imaging lens 36 to be projected on screen 16 for physical viewing, or other utilization.

The laser image intensifier of the instant invention may be modified in many ways without changing its effectiveness, or its basic mode of operation.

Figure 5A:
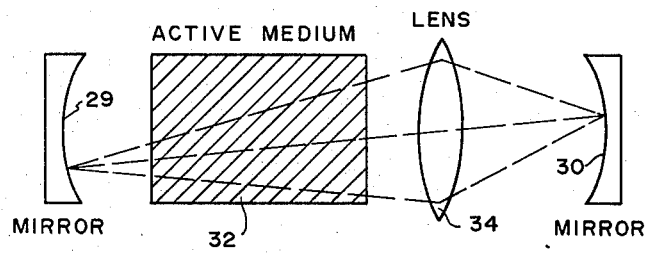
FIG. 5a is a schematic drawing of a conjugate resonator having coincident centers of curvature.
Figure 5B:
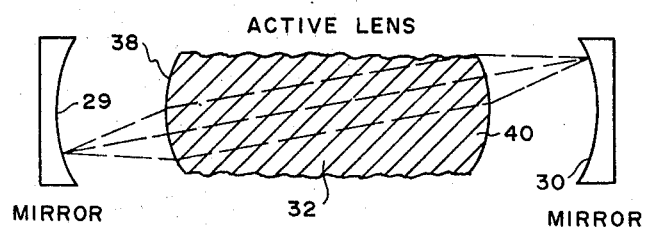
FIG. 5b is a schematic diagram of a conjugate resonator having concentric surfaces of curvature.
Figure 5C:
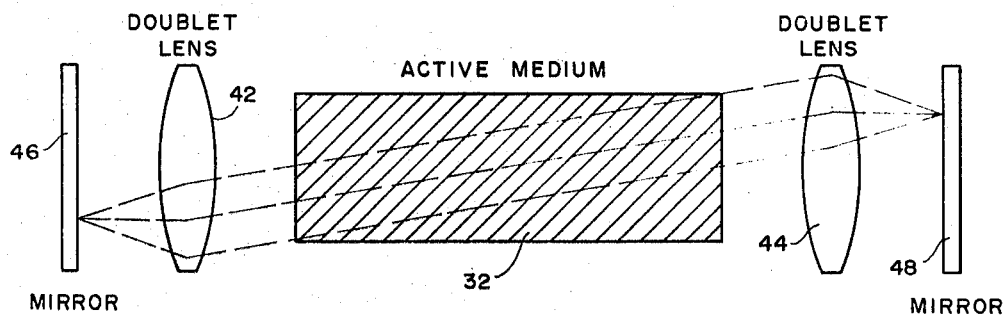
FIG. 5c is a schematic diagram of a flat field conjugate resonator.

For example, conjugate resonators may be produced in a variety of ways including the configuration shown in FIGS. 5a, 5b, and 5c. FIG. 5a shows the preferred conjugate resonator configuration embodiment of the

TABLE I

| Material | Density (gm/cm$^3$) | Index of Refraction, | Penetration n Depth, ( ) | P | Optimized Thickness, d ( ) |
|---|---|---|---|---|---|
| PbTe | 8.25 | 5.35 | 1.80 | 6 | 1.90 |
| PbS | 7.597 | 4.10 | 3.70 | 9 | 3.72 |
| PbSe | 8.273 | 4.59 | 1.82 | 5 | 1.85 |

To facilitate understanding the aforementioned reflectance modulation of the point-to-point laser modes in the conjugate resonator laser, its unique characteristics invention illustrated in FIG. 1.

In this configuration, the laser is simply squared off at its ends, and a lens 34 is provided to image all points on spherical reflecting surface 29 on their conjugate image points on spherical reflecting surface 30. As shown in FIG. 5b, imaging lens 34 may be omitted. However, in the FIG. 5b configuration, the laser must be modified for example by the grinding of the pairs of lens surfaces 38 and 40 at its ends to achieve the imaging of conjugate points on each other, resulting in a resonator which operates exactly the same as that of FIG. 5a. A second alternative is shown in FIG. 5c, in which the laser remains squared at its ends as in FIG. 5a. However, instead of using a single imaging lens 34, a pair of lenses 42 and 44 are used to accomplish the conjugate imaging. In this configuration a pair of flat cavity end reflectors 46 and 48 may be used instead of the spherical reflectors illustrated in FIGS. 5a and 5b.

The essential feature of any conjugate resonator configurations which may be used is that the image of one reflector is produced on a point to point basis on the other, and the volume of active medium used in the lasing between any pair of points is essentially the same. The latter limitations tends to assure that each of the point-to-point modes of the resonator has essentially the same cavity for the same mirror reflectance so that the intensity distribution of the laser output corresponds to the reflectance distribution on the modulatable reflector 26.

A further modification of the device may include optical chopping of the laser operation at a frequency consistent with persistence of vision of the eye. This is done to prevent image smearing when viewing moving targets. More specifically, if a target image which is initially produced on modulatable reflector 26 is retained thereon for a brief interval of time, the laser output could produce a sustained image of the target in its original position. Movement of the target would cause apparent superposition or smearing of the output image since later position of the image would appear to be superimposed on the previous images. This undesirable effect may be readily eliminated by periodically returning the laser to its off condition by the use of a conventional pulsed laser, or by optical chopping within the conjugate resonator cavity. Chopping may be achieved at a very high frequency if desired using a piezo-electric crystal controlled Fabry-Perot resonator, for example, mounted between imaging lens 34 and conjugate resonator end reflector 30. This or any equivalent method of chopping permits viewing of targets moving at a reasonably rapid rate without appreciable distortion or image smearing.

Figure 6:
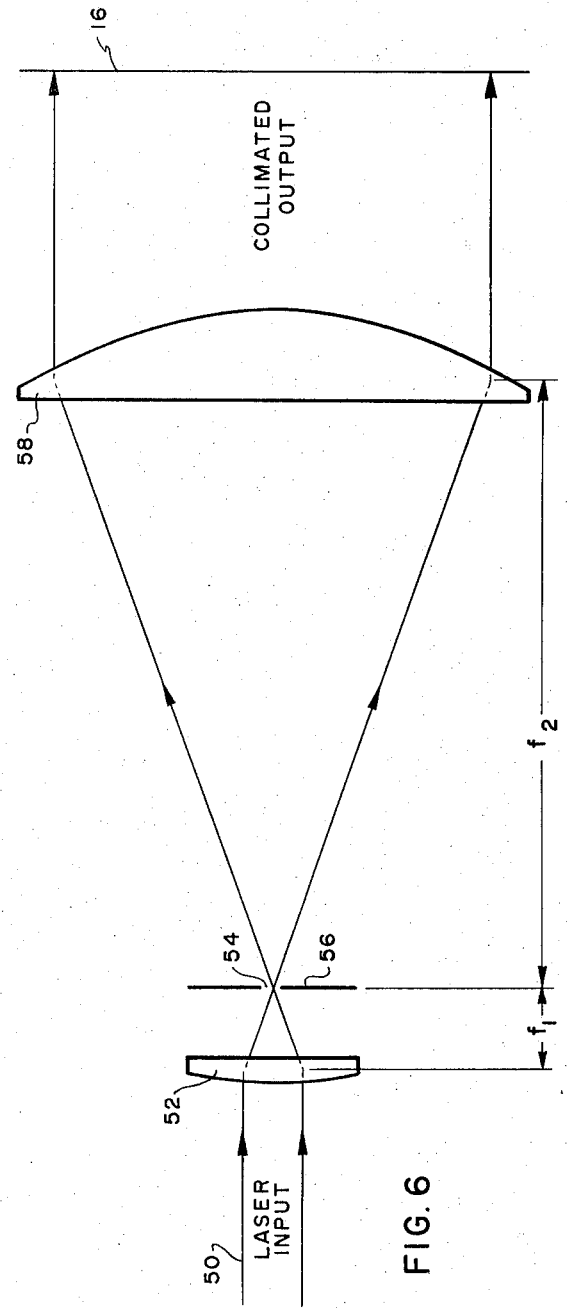
FIG. 6 is a schematic diagram of a laser beam spatial filter and expander.

Another modification of the instant image intensifier may be made to alleviate a possible problem of false image generation due to inhomogeneities which are typically present in conventional laser outputs. This modification involves the addition of a spatial filter to the laser output, as more clearly shown in FIG. 6. In this embodiment the laser beam 50 is passed through a first planoconvex lens 52, which focuses the beam on an aperture 54 formed within an opaque shield 56. The aperture may have a diameter on the order of ten microns, for example. The beam emanating from small aperture 54 is then passed to a second planoconvex lens 58 which in effect expands the laser beam. The expanding lens combined with the small aperture cause the spatial filtering by eliminating inhomogeneities in the laser beam. It will be observed that the first planoconvex lens 52 is oriented so that the laser beam is incident on its spherical surface while the second planoconvex lens 58 is oriented so that the beam output is taken from its spherical surface. This orientation provides for negible spherical operation in the output beams.

Since the output of the laser image intensifier is to be imaged on a screen, it must cover a sufficiently large area for the image to be easily viewed by the human eye. Consequently, it is often desired to expand the diameter of the laser beam. For this reason, the second planoconvex lens 58 of the spatial filter may be chosen large enough in diameter to provide the required amount of beam expansion. In parctice, the spatial filterbeam expanding optical system is positioned between partial reflector 30 and screen 16.

Obviously, further modifications and variations of the present invention are possible in light of the above teachings. For example, electron image intensifier 15 may be replaced by a microchannel plate with an input window. Therefore, it is to be understood that within the scope of the appended claims the invention may be practiced otherwise than as specifically described herein.

What is claimed as new and desired to be secured by Letters Patent of the United States is:

1. A low light level target laser image intensifier comprising:
   a conjugate resonator having a pair of spherical end reflectors, one of said end reflectors having modulatable reflectivity and being comprised of semiconductor material having the characteristics of changing its index of refraction in regions of minority carrier injection and increasing its reflectance in proportion to the density of electrons impinging upon it, said semiconductive material thickness is given by the relation
   $d = p\lambda/2n$
   wherein $p$ is an integer, $\lambda$ is the predetermined wavelength of incident radiation from said lasing means normal to said semiconductive material and $n$ is the index of refraction, having a thickness such that its reflectance varies from a maxima to minima for a given incident wavelength and is approximately equal to the electron penetration depth, said other end reflector being partially reflective to provide an output;
   active lasing means positioned with said conjugate reasonator between said end reflectors; and
   an electron image intensifier for modulating said modulatable reflector, said intensifier comprising:
   photoemissive means for emitting electrons from one surface in response to the impingement of an optical image on the opposite surface thereof;
   means for accelerating said emitted electrons; and
   means for focusing said accelerated electrons onto said modulatable reflector;
   whereby a low light level optical target image causing said impingement on said photoemissive surface is amplified by point to point lasing action between said end reflectors to produce an intensified image at said conjugate resonator output.

2. A laser image intensifier as in claim 1 wherein an active imaging lens is positioned within said conjugate resonator between said lasing means and one of said end reflectors.

3. A laser image intensifier as in claim 1 wherein the ends of said lasing means form an active imaging lens.

4. A laser image intensifier as in claim 1 wherein said end reflectors are planar, and a pair of doublet lenses is positioned within said conjugate resonator, each doublet lens positioned between one end of said lasing means and one of said end reflectors.

5. A laser image intensifier as in claim 1 further comprising;
   means for spatially filtering the output beam of said laser means.

6. A laser image intensifier as in claim 5 wherein
   said spatial filtering means includes an opaque shield having a small aperture therein,
   first optical lens means focusing said laser beam on said aperture; and,
   second optical lens means for expanding said laser beam after it emerges from said aperture.

7. A laser image intensifier as in claim 1 further comprising:
   means for periodically switching off said lasing means.

8. A laser image intensifier as in claim 1 wherein said lasing means comprises helium neon.

* * * * *